July 22, 1930.   R. THURM ET AL   1,771,020
TRAVELING TRAY OVEN
Filed Oct. 16, 1926   2 Sheets-Sheet 1
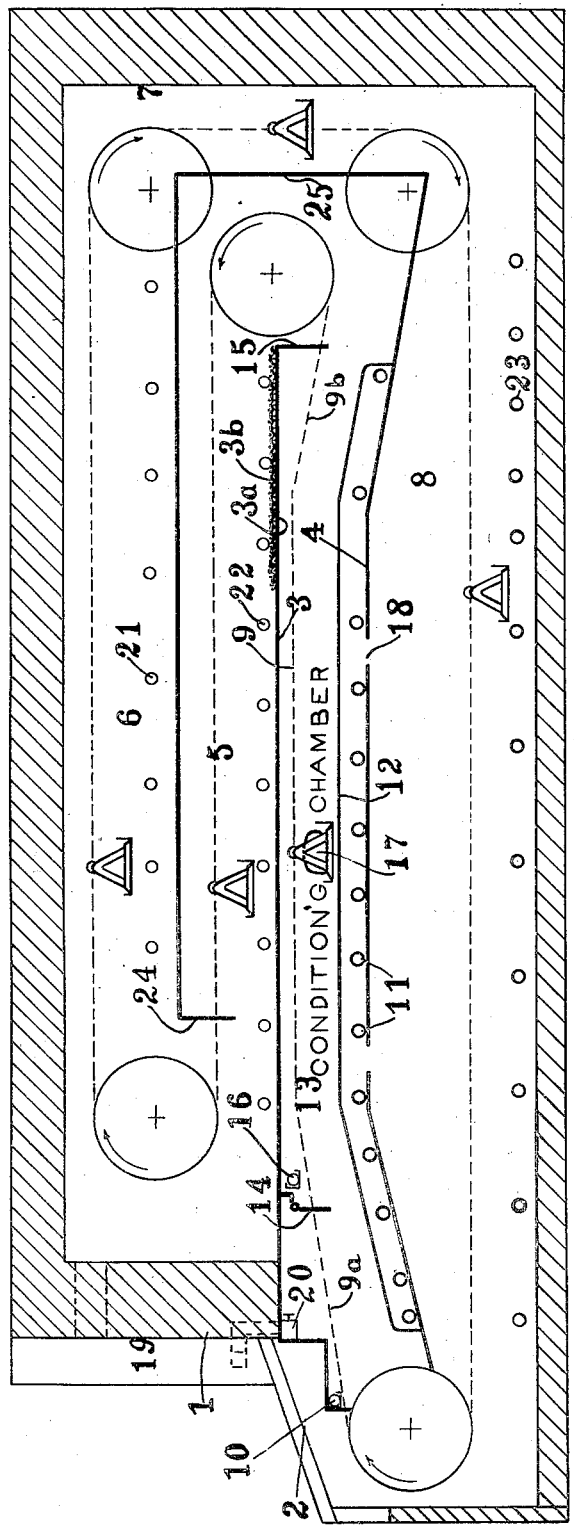
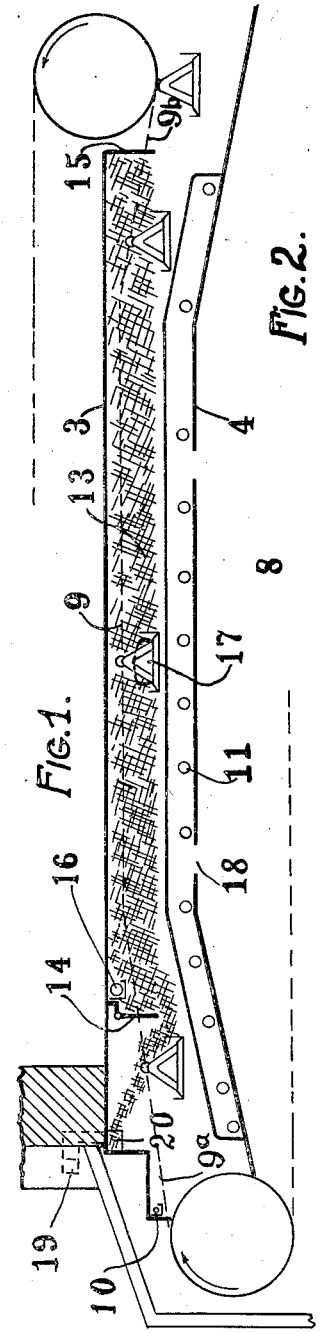
INVENTOR
Richard Thurm
Eugene Oscar Engele
BY
George B Willcox.
ATTORNEY

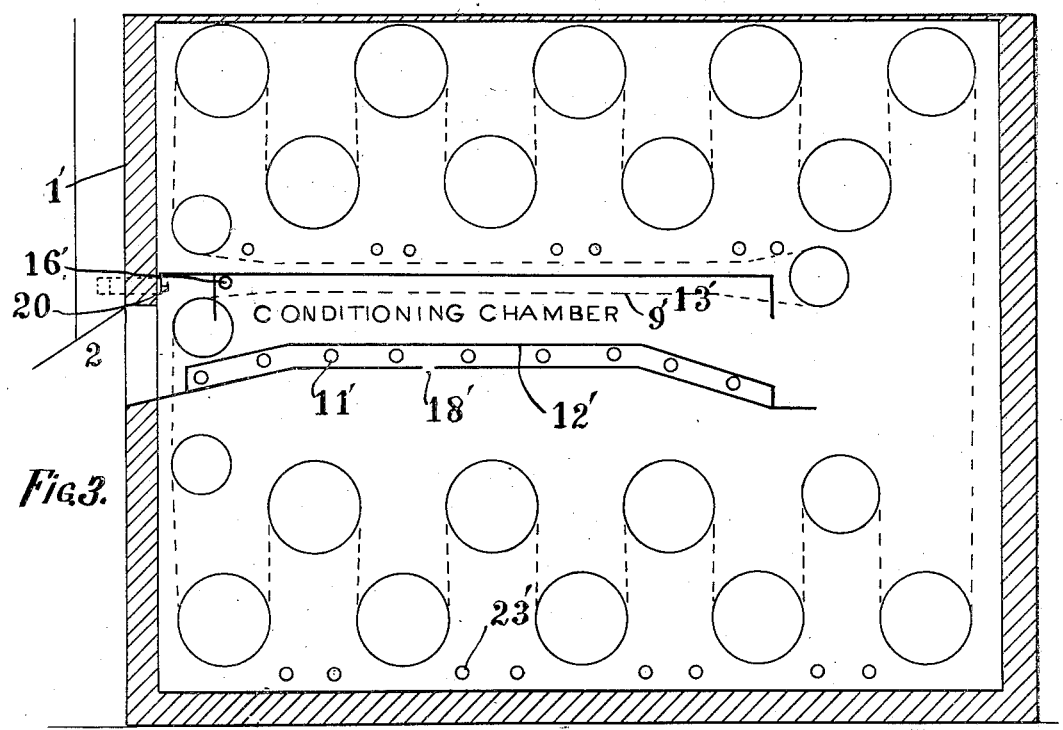

Patented July 22, 1930

1,771,020

UNITED STATES PATENT OFFICE

RICHARD THURM AND EUGENE OSCAR ENGELS, OF SAGINAW, MICHIGAN, ASSIGNORS TO BAKER PERKINS COMPANY, INCORPORATED, OF WHITE PLAINS, NEW YORK

TRAVELING-TRAY OVEN

Application filed October 16, 1926. Serial No. 141,978.

This invention pertains to bake ovens of the well-known traveling tray type that bake material while it is being carried through successive oven chambers or passes or heating zones. The passes or zones may be heated individually or collectively, and usually some of them have means for injecting steam into the atmosphere that surrounds the material.

We have discovered that best performance is attained in a traveling tray oven if the loaf-developing and finishing treatments are severalized and performed as two tasks, mutually correlated though independently regulated. Therefore, in this invention we have segregated these tasks and have provided an oven which performs them in correct and orderly sequence. To the so-called first task, which is completed in the first pass or conditioning chamber, and which will be hereafter referred to as the pass which initially receives the article to be treated, we assign those factors that make for consistent, rapid and economical loaf-conditioning, and to the second task, performed in a subsequent pass or passes, we assign those factors that result in good bake-finishing.

Loaf-conditioning as the term is here used, is the conversion of a piece of proofed dough into a loaf that is virtually sized, shaped and pre-heated, but unbaked. Bake-finishing is the conversion of the conditioned loaf into a finished article by baking. By "proofing" is meant the starting of yeast fermentation in the dough mixture, to impart to the dough its first "raise."

In former types of traveling tray ovens the loaf-conditioning functions were usually mixed with the bake-finishing processes and both were performed indiscriminately throughout the greater part of the working length of the oven.

Loaf-conditioning, carried to completion as a first step, has numerous practical advantages, among which are the following:

Fewer heating elements are required for a given oven output, because the steam is confined to a specific location in the oven, viz. the first chamber, making it unnecessary to introduce a greater amount of steam than is required by the loaves for their proper conditioning. Consequently a minimum of heat is used to superheat excess steam.

Immediate results are produced by regulation of heat and humidity in the conditioning chamber without affecting the temperature of the bake-finishing passes.

Uniform quality of output is maintained, because proper atmospheric conditions can easily be kept in the initial chamber during long hours of oven operation.

Faster conditioning and faster bake-finishing are possible when they occur separately and in sequence than is possible when they are performed together and, as it were, overlapping.

Our invention provides a new location, construction and mode of operation of the conditioning chamber, and novel means for supplying, heating, stabilizing and venting the loaf-conditioning atmosphere of said chamber.

Another inventive feature is in the means for preventing gas or air currents from sweeping through the conditioning chamber and dissipating the conditioning atmosphere by scavenging it into the other parts of the oven, that is, by arranging the conditioning chamber in a neutral or minimum draft zone of the oven housing.

With the foregoing and certain other objects in view, the invention, broadly stated, consists in the provision of a conditioning chamber wherein certain functions take place, followed immediately by a baking pass or passes wherein certain other functions are performed. In its preferred embodiment, therefore, the invention consists generally in a conditioning chamber substantially enveloped by bake-finishing passes that act as a blanket for the said chamber, whereby stabilization of the temperature and humidity in the conditioning chamber is made easier.

The importance of separating conditioning functions from finishing functions being appreciated, we will now explain the general construction and mode of operation of an oven embodying the invention in its preferred form, but first noting the fact that this application brings forward the disclosure of structure in our earlier co-pending application, Serial No. 66,225, filed November 2, 1925, and is a continuation in part of that application.

In the drawings, Fig. 1 is a diagrammatic longitudinal section of an oven embodying a preferred form of the invention.

Fig. 2 is a detail of the conditioning chamber shown in Fig. 1, the confined atmosphere in the steam pocket indicated by the shaded area.

Fig. 3 is a diagrammatic view of a modified form, in which the conditioning chamber is located midway the height of the oven and is enveloped by a series of vertically arranged baking passes.

Since details of oven housings, conveyors, heating elements and humidifying pipes are well known to those skilled in the bake-oven art, and because they do not constitute essential limitations to the claimed invention, their details are omitted from the drawings.

Similar numerals refere to similar parts throughout the several views, except that primes are used for the designation of alternative forms.

The oven is enclosed in a housing preferably shaped like an oblong box. In its front wall 1, about half way up, is a loading aperture 2 for receiving pieces of relatively cool proofed dough at the usual temperature as delivered from a proofer, and which serves also as the discharge opening for the oven. Within the housing and directly in front of this aperture are two partitions 3, 4, horizontal or approximately so and arranged one above the other. They are respectively the ceiling and the floor of that part of the oven which has been referred to as the initial pass, including the receiving compartment and conditioning chamber.

The conditioning chamber performs its work by certain devices which will now be described, bearing in mind the fact that loaf-conditioning is an operation intermediate between dough-proofing and loaf-finishing.

At the entrance to the conditioning chamber a steam pipe 10 supplies moisture for dampening the loaves, preliminary dousing with wet steam being advantageous in certain kinds of baking. For purposes of description we have shown gas burners of known type, and will describe the mode of operation of an oven so equipped, but the gas burners are to be understood as being merely an exemplification of any suitable type of heating means.

Near the floor 4 are heating elements 11, preferably enclosed by sheet metal covers 12. These covers keep the products of gas combustion away from the atmosphere of the conditioning chamber and spread the burner heat uniformly throughout the lower part of the conditioning chamber. Moreover, covers 12 permit the burners to be spaced relatively far apart, decreasing the number of burners and saving fuel, yet causing an even distribution of heat throughout the chamber.

Conditioning is made to take place completely or nearly so and in a normal manner by applying a properly heated and humidified atmosphere to all the exposed loaf surfaces, the following means being employed for that purpose:

A steam pocket 13 is located in the upper part of the shallow horizontal conditioning chamber. In a preferred embodiment shown in Fig. 2, its end walls are formed by downwardly projecting plates or baffles 14, 15.

Steam, preferably saturated and at low pressure, is supplied to pocket 13 through pipe 16, and since the pocketed steam tends to cling to the upper partition 3 rather than the lower part of the chamber, we provide suitable elevating means, as an inclined part 9ª of the tray conveyor 9, to guide the loaves 17 upwardly into the confined steam-laden atmosphere of the pocket. Similar means 9ᵇ may be provided to bring the loaves down out of the pocket.

Heat from the heating elements 11 is reflected downward from roof partition 3 and supplies the top heat for the loaves in the conditioning chamber.

The atmosphere of the steam pocket can be held at any desired degree of temperature, humidity or aridity by regulating the amount of steam supplied through pipe 16 and by controlling the heat of burners 11.

To check the transmission of heat from above the chamber into quiescent steam pocket 13, and to thereby avoid superheating the steam in the pocket, as well as to assist in stabilizing the heat in the conditioning chamber, I preferably make the roof partition 3 of heat-retarding or insulating material, as for example, steel plates 3ª overlaid with sheet asbestos 3ᵇ. Other of the partitions also may be made heat-retarding, as needed.

As has been heretofore stated, circumstances frequently require that it be possible to make quick changes in heat degree and humidity in the conditioning chamber.

Due to the construction of our oven it is more convenient to change the heat and humidity conditions within the confined space of the conditioning chamber than it is in ordinary types of ovens, thereby, within commercial limits we can control adverse dough conditions that may have existed prior to placing the dough in the baking chamber of the oven.

As an instance, we will assume that the pieces of dough have been under-proofed in the proofing closet, or, as the baker says, the dough is "too young". That fault can be corrected during conditioning by decreasing the heat and increasing the humidity in pocket 13. On the other hand, if the dough has been overproofed, or is too old, conditioning heat is increased and humidity is decreased. In either event faulty proofing is corrected in the initial pass or zone and the loaves are delivered from the conditioning chamber into the bake-finishing passes uniform in size, quality and appearance.

The inverted pocket 13 constituting the upper part of the conditioning chamber is filled with steam, and during normal operation of the oven, vapors from the loaves rise and tend to accumulate in this pocket. This, it will be understood, is because of the buoyancy of such vapors. Excess volumes of such vapors, may, if desired, be disposed of by being vented into a stack 19 through a valve controlled outlet 20, as represented clearly by the shaded area at the forepart of the conditioning chamber as shown in Fig. 2. By thus relieving the conditioning chamber of excess vapors or steam at the forepart thereof, no appreciable quantity of such vapors or steam is permitted to pass rearwardly into the oven and to the subsequent passes thereof. Obviously, therefore, no drafts or damaging air agitation can occur either in the conditioning chamber or in the bake passes.

Having considered the construction and mode of operation of the conditioning chamber, the bake-finishing passes will now be discussed.

The end of the conditioning chamber which is remote from aperture 2 communicates with the first pass of a connected series of passes 5, 6, 7, 8 that together constitute the loaf-finishing chamber.

The loaf, carried by a conveyor 9, upon emerging from the conditioning chamber travels through passes 5, 6, down through pass 7 at the rear of the oven, forward through bake-finishing pass 8 which is underneath the conditioning chamber, and finally out through an unloading station, preferably the aperture 2.

The loaf-finishing chamber finishes the newly conditioned loaf by causing baking heat to penetrate to the center, while imparting to the surface any desired crust finish and color. Each loaf-finishing pass is, therefore, individually heat-regulated and the series of passes 5, 6, 7, 8, served by the tray conveyor 9, control the loaf-finishing processes as entirely as the conditioning chamber controls the processes of loaf-conditioning.

Floor 4 of the conditioning chamber forms the roof of the final pass 8. In addition to heat radiated downwardly through floor 4, hot gases escape from the space beneath the burner covers 12, and passing down through vents 18, heat the loaves in pass 8.

Accurate control of temperature and quantity of heat is individually secured for each horizontal baking pass 5, 6, 8 by means of a plurality of independently regulatable heating elements 21, 22, 23.

At an end of baking pass 5 a downwardly projecting baffle 24, preferably an asbestos curtain, may be hung. Preferably, a baffle wall 25 closes the opposite end of the pass, and its lower edge joins the rear edge of floor plate 4 of the conditioning chamber.

Between baffle wall 25 and the rear wall of the oven housing is downward pass 7 which leads to the outgoing finishing pass 8 and also envelops the inner end of the conditioning chamber.

Having described the equipment of the conditioning and bake-finishing chambers we will now recall another stated feature of invention, namely, locating the conditioning chamber in a zone of minimum draft which is found at about half the height of the oven housing. If the conditioning chamber were located at the bottom of the heated housing there would be a strong tendency for heated vapors to be discharged from the conditioning chamber, and in such event there would be an undesirable flow of air around the material while in process of being conditioned. We have discovered that the conditioning chamber, when located about half way up the oven housing, tends to retain its steam-charged atmosphere practically quiescent, because in that part of the oven there apparently exists what may be termed a neutral zone, or zone of balanced draft, in which there is no appreciable tendency to establish air currents around the material.

Since there is no draft-induced influx of cold air and no waste of steam or heated air, fuel is economized and operating costs are reduced.

A third stated feature of invention has been mentioned, namely, envelopment of the conditioning chamber by certain of the finishing runs, each of which may have means for individual heat control. An independently heated zone is thus established within which the whole conditioning process is carried on. This blanket of heated atmosphere surrounding the conditioning chamber eliminates nearly all heat losses and facilitates stabilization of heat and humidity conditions around the loaf while it is being conditioned.

The invention is subject to various modifications included within the scope of certain claims. For example, the conditioning chamber, disposed horizontally and about midway the height of the housing, may be enveloped by a series of vertical conveyor runs as in Fig. 3.

It will be noted, though, that however the bake passes may be located or disposed with respect to the conditioning chamber, nevertheless the primary treatment to which the "proofed" dough is subjected in this oven is its introduction to a steam-filled and heated zone.

While the invention includes the combined loaf-conditioning and loaf-finishing instrumentalities herein described, we wish it understood that we consider the aforesaid means not only combinatively novel, but in so far as now advised, certain of the devices going to make up such means are new in less combinations than the whole, and some are capable of individual use.

Our conditioning chamber is an example of this capability of individual use. Considered by itself, it is an instrumentality for rapidly and economically converting pieces of proofed dough into fully developed, completely conditioned loaves ready for bake-finishing. It might conceivably be used individually, for it is provided with all necessary devices for loaf conditioning, including the shallow confined steam pocket 13, the conveyor runs $9^a$, $9^b$ or their equivalents acting in conjunction with the pocket as lifting devices for subjecting the material to the conditioned atmosphere therein, the enclosed gas burners 11 located within the conditioning chamber and beneath the steam pocket 13, and a vent 20 for excess loaf-liberated gases. The conditioning chamber, may, therefore, be considered a lesser combination of the sort above referred to.

So far as we are aware, conditioning and finishing have not heretofore been definitely segregated in ovens of the horizontal or vertical multiple-pass, traveling-tray type, but usually the two operations have been mixed and allowed to occur more or less together. The result, oven control that is inherently imperfect, has prevented the general adoption of ovens of the multiple pass tray type for use in small and medium capacity general purpose bakeries. Such plants must produce various goods, requiring an oven adaptable to many kinds of loaf treatment.

This invention enables the baker to produce from one oven any desired kind of goods, for he can properly apportion the supply of heat, the relative humidity and the baking time in each of the various chambers or passes. If he desires a loaf with large volume and a glossy top he can increase the humidity in the conditioning chamber, decrease the burner heat, and by changing the rate of tray travel, can lengthen the baking time.

To change to a small volume, dull crust loaf, he decreases humidity, increases burner heat and slightly shortens baking time. For pound cake he increases both humidity and heat supply in the conditioning chamber and lengthens the baking time. Moreover, he can quickly re-adapt the functioning of the various passes of this oven from the requirements of white bread to those of rye or so-called hearth bread, or cakes, biscuits and other products. Any combination of such changes is easily brought about in a few minutes in an oven having the improvements herein described.

Having thus described our invention, what we claim and desire to secure by Letters Patent is:

1. In a traveling tray oven having a plurality of baking passes, a conditioning chamber within said oven, means for maintaining a quiescent steam-charged atmosphere in the upper part of said chamber, conveying means adapted to lift material into and traverse it through said quiescent atmosphere and to lower it therefrom, and a plurality of enclosed gas burners in said chamber beneath said steam-charged atmosphere, for the purposes set forth.

2. In an oven having a baking chamber, a conditioning chamber of the character herein described, adapted to convert pieces of proofed dough into completely formed and conditioned unbaked loaves, a plurality of gas burners within said chamber near its bottom, covers for said burners adapted to prevent escape of gases of combustion into said conditioning chamber, and means for venting into said baking chamber the space enclosed by said covers.

3. In a traveling tray oven having a plurality of baking passes, a conditioning chamber within said oven, means for maintaining a quiescent steam-charged atmosphere in the upper part of said conditioning chamber, conveying means adapted to lift material into and traverse it through said quiescent atmosphere and to lower it therefore, gas burners in said chamber beneath said steam-charged atmosphere, covers enclosing said gas burners to prevent escape of burned gases into the atmosphere of said conditioning chamber, and means for releasing surplus quantities of said atmosphere from said chamber.

4. In a traveling tray oven comprising a housing and conveyor means therein, a conditioning chamber of the character herein described located within said housing, a plurality of heated finishing passes also within said housing and enveloping said conditioning chamber around its top, bottom, and one end, said finishing passes connected in series and comprising an enveloping independently heated zone adapted to stabilize the atmospheric conditions within said conditioning chamber.

5. In a traveling tray oven, a conditioning chamber to initially receive articles to be treated and a finishing chamber connected in series, said conditioning chamber having heat and humidity controlling means, said finishing chamber comprising a plurality of independently heated passes enveloping said conditioning chamber, said conditioning chamber located in a zone of neutral draught.

6. In an oven of the character described, a conditioning chamber to initially receive articles to be treated, baking passes connected in series and with said chamber, certain of said passes above, below, and over one end of said chamber, and a tray-carrying mechanism passing through said chamber and said passes.

7. In a traveling tray oven, a conditioning chamber to initially receive articles to be treated, said chamber having individual heating and humidity controlling means, and a finishing chamber comprising a plurality of individually heated passes connected in series with said conditioning chamber, certain of said passes arranged to envelope the top of said conditioning chamber and certain others arranged to envelope its bottom, for the purposes set forth.

8. In a traveling tray oven comprising a housing and conveyor means therein, a horizontally disposed conditioning chamber of the character herein described located within said housing, and a plurality of independently heated finishing passes enveloping said conditioning chamber around its top, bottom and one end, said finishing chambers connected in series and comprising an enveloping heating zone adapted to stabilize the atmospheric conditions within said conditioning chamber.

9. In a gas-heated bake oven, a conditioning chamber having a steam pocket therein, gas burners in said chamber beneath said steam pocket and baffle means associated with said burners for isolating the burner space from the steam space, whereby the gases of combustion from said burners are kept out of contact with the loaves while being treated in the steam atmosphere of said pocket.

10. In a traveling tray oven having a plurality of baking passes, a substantially horizontal conditioning chamber within said oven, means for maintaining a quiescent steam charged atmosphere in the upper part of said conditioning chamber, conveying means adapted to lift material to and traverse it through said quiescent atmosphere and to lower it therefrom, enclosed gas burners in said chamber beneath said steam-charged atmosphere, a vent to permit surplus gases to escape from the lower part of said chamber without disturbing the quiescent atmosphere in said chamber.

11. In a bake oven having a plurality of passes, means for conveying material successively through said passes, a housing having a loading aperture located substantially at mid-height thereof, the initial pass including an enclosed receiving compartment in communication with said aperture, followed by an inverted steam chamber communicating at one end with said receiving compartment and at the other end with said other passes.

12. In a multiple pass bake oven, transverse baffles in the first pass, extending downwardly from the ceiling thereof part way to its bottom and defining between them an inverted steam pocket in the top of said first pass toward the rear thereof, means for passing articles through said first pass and pocket, valve-controlled means for venting the introductory part of said first pass at a place ahead of said steam pocket, means for introducing steam into said introductory part, and means for heating the said first pass.

13. In a traveling tray bake oven, an initial pass, an inverted pocket extending part way only the length of said first pass along its ceiling, means for introducing vapor into the pocket, means for introducing steam into the pass in advance of the pocket, means for heating the pass and pocket, a vapor outlet communicating with the introductory part of said pass at a place ahead of said pocket, and conveyor means for moving goods while traveling through said pass into, through and out of contact with a body of vapor contained in said pocket.

14. In an oven having a baking chamber, a conditioning chamber of the character herein described, adapted to convert pieces of proofed dough into completely formed and conditioned unbaked loaves, a plurality of heating elements within said chamber, covers for said heating elements separating them from communication with the main body of said chamber, and means for venting into a pass of said baking chamber the space enclosed by said covers.

15. An oven as specified in claim 14, in which a wall of the conditioning chamber is heat-retarding, adapted to resist rapid transfer of heat to or from said conditioning chamber, for the purposes set forth.

16. A bake oven having a plurality of passes connected in series and having means for conveying material successively therethrough, the pass which initially receives the article to be treated having at its intake end a receiving compartment provided with a steam intake pipe and heating elements, and a vent communicating with said receiving compartment for delivering vapors, said initial pass also including a chamber, the atmosphere whereof is maintained in substantially quiescent condition, said receiving compartment and chamber co-operating to convert a piece of proofed dough into a loaf that is sized, shaped and pre-heated, but unbaked, the subsequent passes being individually heated bake-finishing passes.

17. In a bake oven including a plurality of passes and means for conveying material successively through said passes, a housing having a loading aperture, a substantially horizontal loaf-conditioning chamber which initially receives the article to be treated, an end of said chamber communicating directly with said aperture, its other end communicating with said passes and located in a zone of neutral draft, devices associated with said initial chamber for respectively supplying and heating the loaf-conditioning atmosphere of said chamber, a wall of the conditioning chamber being made of heat-retarding material adapted to resist rapid transfer of heat from an adjacent pass to or from said conditioning chamber, for the purposes set forth.

18. In a bake oven having a plurality of passes and means for conveying material successively through said passes, a wall of the oven formed with a loading and unloading aperture located substantially at mid-height thereof, a conditioning chamber defined by spaced top and bottom partitions and enclosing a run of said conveyor that leads substantially horizontally directly away from said aperture, said conditioning chamber communicating with said passes at its delivery end and heating elements and humidifying devices operatively associated with said chamber.

19. In a bake oven having a loading aperture in the front wall thereof, a substantially horizontal partition extending from the front wall rearwardly toward the rear wall, a second partition beneath and spaced from said first-mentioned partition and extending rearwardly from a point adjacent the front wall and the bottom of the loading aperture, conveying means operated between said partitions and in circuitous paths within the oven outside the chamber defined by said partitions, heating elements between said partitions, humidifying means arranged to supply moisture to the material on the conveyor in the space between the partitions.

20. In a bake oven having a loading aperture in the front wall thereof, a substantially horizontal partition extending from the front wall rearwardly toward the rear wall, a second partition beneath and spaced from said first-mentioned partition and extending from a point adjacent the front wall and the bottom of the loading aperture rearwardly to a point in the oven beyond the end of the upper partition, conveying means operated between said partitions and in circuitous paths within the oven outside the chamber defined by said partitions, heating elements between said partitions and disposed beneath the conveyor therein, and humidifying means arranged to supply moisture to the material on the conveyor in the space between the partitions.

21. In a bake oven having a loading aperture in the front wall thereof, a substantially horizontal partition extending from the front wall rearwardly toward the rear wall, a second partition beneath and spaced from said first-mentioned partition and extending from a point adjacent the front wall and loading aperture rearwardly to a point in the oven beyond the end of the upper partition, an upstanding baffle wall rising from the lower partition, conveying means operated between said partitions and in circuitous paths within the oven above the upper partition, thence downward near the rear wall of the oven and between said rear wall and said baffle wall, and thence forwardly beneath the lower partition to said aperture.

22. In combination, a bake oven having a loading aperture in the front wall thereof, a substantially horizontal partition extending from the front wall rearwardly, a second partition beneath and spaced from said first-mentioned partition and extending from a location adjacent the loading aperture rearwardly to a place in the oven beyond the end of the upper partition, an upstanding partition located at the rear part of the said lower partition and projecting above the level of the said second partition and spaced from the rear wall of the oven, conveying means operated between said horizontal partitions and in circuitous paths within the oven above the second partition, thence downward between the rear wall of the oven and said upstanding partition and finally forwardly beneath the lower partition to said aperture.

23. A structure as set forth in claim 22 wherein a third substantially horizontal partition extends forwardly from the upper part of the upstanding partition, defining with the first-mentioned partition and the ceiling of the oven two chambers in each of which heating elements are located near the bottom and through which the conveyor passes successively.

24. In combination with an oven having a loading aperture in a wall thereof, two partitions in vertically spaced relation extending rearwardly, from the upper and lower parts of said loading aperture respectively, toward the rear of the oven and defining between them a substantially horizontal chamber to initially receive the articles to be treated, means at the entrance of said chamber for introduction of moisture, additional moisture-supplying means farther within the chamber, heat-supplying elements distributed within the chamber near its bottom, outlets in proximity to said heat-supplying elements, an upstanding partition between the delivery end of the conditioning chamber and the rear wall of the oven, defining a vertical chamber, a partition between the ceiling of the conditioning chamber and the roof of the oven defining two communicating baking chambers in superposed relation, heating elements distributed along said two chambers near their bottoms, a vent connecting the upper of said chambers with the outside, the partition comprising the floor of said conditioning chamber spaced above the oven floor and defining a horizontal bake-finishing chamber, heating elements distributed along the bottom of said chamber, and conveying means operating through said conditioning chamber and between and around said partitions in circuitous paths above the respective heating elements in successive chambers.

25. In a bake oven having a plurality of passes and means for conveying material successively through said passes, a wall of the oven formed with a loading and unloading aperture located substantially at mid-height thereof, a conditioning chamber defined by a top partition, that projects outwardly beyond the plane of the front wall of that part of the oven which is above the conditioning chamber, and a bottom partition spaced below the top partition, said conditioning chamber enclosing an initial run of said conveyor that leads substantially horizontally directly away from said aperture, said conditioning chamber communicating with said passes at its delivery end, heating elements and humidifying devices operative within said chamber.

Signed at Saginaw, Michigan, this 17th day of September, 1926.

EUGENE OSCAR ENGELS.
RICHARD THURM.